US008370262B2

(12) United States Patent
Blessing (10) Patent No.: US 8,370,262 B2
(45) Date of Patent: Feb. 5, 2013

(54) SYSTEM AND METHOD FOR PERFORMING SECURE ONLINE TRANSACTIONS

(75) Inventor: Werner Blessing, Horw (CH)

(73) Assignee: Biometry.Com AG, Alpnach (CH)

(*) Notice: Subject to any disclaimer, the term of this patent is extended or adjusted under 35 U.S.C. 154(b) by 306 days.

(21) Appl. No.: 12/292,325

(22) Filed: Nov. 17, 2008

(65) Prior Publication Data

US 2009/0138405 A1    May 28, 2009

(30) Foreign Application Priority Data

Nov. 26, 2007   (EP) .................................... 07121534

(51) Int. Cl.
  *G06Q 20/00*    (2012.01)
(52) U.S. Cl. .............. 705/64; 705/16; 705/39; 235/379; 340/5.1; 379/91.01; 379/91.02; 902/2
(58) Field of Classification Search ..................... 705/64
See application file for complete search history.

(56) References Cited

U.S. PATENT DOCUMENTS

| | | | |
|---|---|---|---|
| 5,586,171 A * | 12/1996 | McAllister et al. | 379/88.02 |
| 5,666,400 A * | 9/1997 | McAllister et al. | 379/88.01 |
| 5,740,361 A | 4/1998 | Brown | |
| 6,101,264 A | 8/2000 | Wagner et al. | |
| 6,199,067 B1 * | 3/2001 | Geller | 1/1 |
| 6,219,639 B1 * | 4/2001 | Bakis et al. | 704/246 |
| 6,219,640 B1 * | 4/2001 | Basu et al. | 704/246 |
| 6,421,453 B1 * | 7/2002 | Kanevsky et al. | 382/115 |
| 7,657,431 B2 * | 2/2010 | Hayakawa | 704/246 |
| 7,725,732 B1 * | 5/2010 | Ballard | 713/186 |
| 2001/0049785 A1 | 12/2001 | Kawan et al. | |
| 2002/0113687 A1 * | 8/2002 | Center et al. | 340/5.82 |
| 2002/0152070 A1 * | 10/2002 | Oda | 704/246 |
| 2003/0229492 A1 * | 12/2003 | Nolan | 704/247 |
| 2004/0010724 A1 * | 1/2004 | Brown et al. | 713/202 |
| 2004/0095945 A1 | 5/2004 | Woog | |
| 2005/0097037 A1 * | 5/2005 | Tibor | 705/39 |

(Continued)

FOREIGN PATENT DOCUMENTS

EP    2065823 A1 *    6/2009

OTHER PUBLICATIONS

Anil K. Jain et al. An Introduction to Biometric Recognition. Jan. 2004.*

(Continued)

*Primary Examiner* — James A Reagan
(74) *Attorney, Agent, or Firm* — Oliff & Berridge, PLC (57) ABSTRACT

The system and method performing secure online-transactions based on challenge/response procedures executed by a terminal of at least one customer and by a terminal of a service provider, such as a bank, which terminals are connected to a network, preferably the Internet. The inventive method including:
  capturing biometric elements, such as audio and video samples or related biometric data, from the customer during an enrollment procedure and storing the biometric elements in a database, which is accessible by the service provider's terminal;
  executing synchronized challenge procedures for each transaction in order to produce identical challenges based on current transaction data;
  capturing biometric data from the customer's response to the challenge with the customer's terminal;
  delivering transaction data together with the biometric data of the customer's response to the service provider's terminal;
  retrieving and assembling biometric elements according to the challenge in order to assemble response in the service provider's terminal; and
  comparing the biometric data of customer's response with the data of the assembled response and performing the requested transaction in the event that the data of the responses match.

17 Claims, 7 Drawing Sheets

U.S. PATENT DOCUMENTS

| | | |
|---|---|---|
| 2007/0043681 A1 | 2/2007 | Morgan et al. |
| 2007/0078835 A1* | 4/2007 | Donnelli ............................ 707/3 |
| 2007/0198262 A1* | 8/2007 | Mindlin et al. ............... 704/246 |
| 2007/0198849 A1* | 8/2007 | Mozer ............................ 713/186 |
| 2007/0241861 A1* | 10/2007 | Venkatanna et al. .......... 340/5.52 |
| 2007/0267478 A1* | 11/2007 | Turek et al. .................... 235/379 |
| 2008/0040262 A1* | 2/2008 | D K et al. ........................ 705/39 |
| 2008/0091425 A1* | 4/2008 | Kane ............................ 704/246 |
| 2008/0156866 A1* | 7/2008 | McNeal ........................ 235/379 |
| 2008/0172230 A1* | 7/2008 | Hayakawa ..................... 704/249 |
| 2008/0307486 A1* | 12/2008 | Ellison et al. ...................... 726/1 |
| 2009/0175506 A1* | 7/2009 | Polcha et al. ................. 382/116 |
| 2009/0217361 A1* | 8/2009 | Crandell ............................ 726/5 |
| 2009/0319270 A1* | 12/2009 | Gross ............................ 704/246 |
| 2009/0319271 A1* | 12/2009 | Gross ............................ 704/246 |
| 2010/0088509 A1* | 4/2010 | Fedronic et al. .............. 713/159 |
| 2010/0321155 A1* | 12/2010 | Ballard ........................ 340/5.81 |
| 2011/0112838 A1* | 5/2011 | Adibi ............................ 704/249 |

OTHER PUBLICATIONS

Menezes et al., "Chapter 1: Overview of Cryptography", *Handbook of Applied Cryptography*, 1997, pp. 1-48, CRC Press, Boca Raton.
Jain et al., "An Introduction to Biometric Recognition", *IEEE Transactions on Circuits and Systems for Video Technology. Special Issue on Image- and Video-Based Biometrics*, Jan. 2004, vol. 14, No. 1.

* cited by examiner

13 ENROLMENT SERVER

130 ENROLMENT MODULE
131 ADMINISTRATION MODULE
132 DICATATION MODULE
133 CAPTURING MODULE
134 ENCRYPTION MODULE

23 CUSTOMER TERMINAL

230 END USER MODULE
231 ADMINISTRATION MODULE
232 CHALLENGE MODULE
233 CAPTURING MODULE
234 ENCRYPTION MODULE

FIG. 10

SYSTEM AND METHOD FOR PERFORMING SECURE ONLINE TRANSACTIONS

BACKGROUND OF THE INVENTION

The implementation of various Internet applications with transaction capabilities that allow buying or selling goods and performing commercial, financial or official transactions is steadily accompanied by concerns relating to transaction vulnerabilities, crypto system weaknesses and privacy issues.

Technological developments made a variety of controls available for computer security including tokens, biometric verifiers, encryption, authentication and digital signature techniques using preferably asymmetric public-key methods (see [1], A. Menezes, P. van Oorschot, S. Vanstone, HANDBOOK OF APPLIED CRYPTOGRAPHY, CRC-Press, Boca Raton 1997, chapter 1).

An advanced system for performing secure online transactions is disclosed in, [2], US 2007/0043681 A1. As described in [2], service providers typically invest a huge amount of money on security infrastructure and fraud countermeasures that can deter even the most accomplished fraudsters. However, customers do not always share the knowledge, the desire or the financial resources necessary to maintain such high degrees of security. Accordingly, it is not uncommon for fraudsters to concentrate on attacking the systems that customers use for interacting with service provider systems.

The core element of security services is authentication, namely the assurance of the identity of the customer to the service provider, such as a commercial, financial or official service provider, e.g. a bank.

Authentication of a customer may be performed by means of the public-key cryptosystem disclosed 1976 by Diffie and Hellman, which is based on two keys, a private-key and a public-key, owned by customers of this system. Hence, these cryptosystems are based on individuals being identified by auxiliary means, which may not be available or which may already be obsolete when needed. Further, these auxiliary means may get copied and then be misused by an attacker. Still further, the auxiliary means are issued by a third party that requires trust and may therefore not be accepted by certain parties.

Hence, although additional equipment is required, customers and service providers often prefer "Biometric identification" that uses biometric data, which can not get lost or obsolete, since it is inherently coupled to a customer. "Biometric identification" is performed by means of a unimodal or multimodal system that is capable of capturing a biometric sample from a customer; extracting biometric data from that biometric sample; comparing that specific biometric data values with that contained in one or more reference templates; deciding how well the data match; and indicating whether or not an authentication, i.e. an identification or verification of the identity of the customer has been achieved. Typically, with the verification function, a match between proffered biometric data of a customer and the "biometric template" stored for this customer during enrolment is evaluated. For identification purposes a one-to-many search is performed between proffered biometric data and a collection of "biometric templates" representing all of the subjects who have enrolled in the system.

Current Biometric Recognition techniques are described in [3], Anil K. Jain, Arun Ross and Salil Prabhakar, An Introduction to Biometric Recognition, IEEE Transactions on Circuits and Systems for Video Technology, Special Issue on Image- and Video-Based Biometrics, Vol. 14, No. 1, January 2004. According to [3] a number of biometric characteristics exist and are in use in various applications. Each biometric has its strengths and weaknesses, and the choice depends on the application. No single biometric is expected to effectively meet the requirements of all the applications. In order to avoid weaknesses off specific biometrics it has been proposed to use multimodal systems.

A multimodal system that comprises text-dependent voice recognition is disclosed in [4], U.S. Pat. No. 6,101,264. Instead of comparing static biometrics, which could easily get copied by an attacker, the system disclosed in [4] is based on capturing and comparing predetermined actions of a customer. As an example, it is proposed to perform typical movement actions such as performing a walk or a head movement or speaking a predetermined word or sentence for text-dependent voice recognition. The performance of predetermined actions however is based on a previously made determination which is static and does not provide a much higher reliability. An impostor may overview the authentication procedure with the predetermined movement sequence performed by the customer and subsequently try to make fraudulent use of the gained information. Hence the risk of spoof attacks resulting in a false acceptance is still not neglectable with this method.

Still further, correct authentication, based on which the service provider, e.g. a bank, is granting access to its services, does not guarantee a secure performance of the initiated transactions. As important as the authentication of the customer is the authentication of a request or order issued by the customer.

As described in [2], so-called "man in the middle" (MITM)-attacks, which may be executed by a so-called Trojan horse, strongly endanger secure execution of transactions requested by a customer. When executing this attack messages exchanged between the customer and the bank are read and modified, without either party knowing that the communications path between the contractual parties has been compromised.

Hence, messages sent by a customer are intercepted by the MITM process, possibly modified and relayed to the bank. In the same manner messages sent by the bank are intercepted by the MITM process, possibly modified and relayed to the customer.

In this way the authentication process, as well as the transaction process, are performed under the control of the malware, which can modify the transaction data to the benefit of a fraudster who has implanted the Trojan horse in the customer's computer terminal.

In order to avoid the execution of transactions that are based on manipulated transaction data, the service provider typically initiates a verification process comprising a further challenge/response sequence. The challenge comprises a transaction summary that should enable the customer to verify the transaction data provided to the banking system.

However the Trojan horse will again intercept and modify the challenge, so that the customer will not be presented the transaction data actually registered at the service provider but the customer's data that were captured by the Trojan horse.

Hence in [2], it is proposed to adapt the verification request so that it is difficult for an automated process to use or modify information therein to generate a replacement request. This definition indicates that the object pursued in [2] is to make it more difficult for a fraudster to achieve his goal. Hence, with additional efforts, detecting fraudulent measures and presenting counter-measures, the problem is not fundamentally resolved, because for each counter-measure a new fraudulent measure will be searched for.

While it will never be possible to completely avoid attacks of fraudsters it would be desirable to get a higher security while at the same shortening the chain of measures and countermeasures, thus increasing security while simultaneously reducing the overall efforts to perform a transaction.

Hence, it is an object of the invention to provide an improved method and an improved network-based system that allow on-line authentication of customers and authentication of transaction requests issued by the customer.

It would be desirable to provide an improved method and an improved network-based system that are invulnerable to "MITM" attacks that are executed for example by a Trojan horse.

It would be desirable in particular to define a method that provides higher security and that can be executed with fewer transmissions thus requiring less transmission resources.

More particularly it would be desirable to provide a method that can be executed with computer systems and peripheral devices that are typically available at a customer site, thus avoiding special equipment.

SUMMARY OF THE INVENTION

The above and other objects of the present invention are achieved by a method and a network-based system according to claim 1 and 9 respectively.

The method and network-based system allow performing secure online-transactions based on challenge/response procedures executed by a terminal of at least one customer and by a terminal of a service provider, such as a bank.

The inventive method comprises the steps of
  capturing biometric elements, such as audio and video samples or related biometric data, from the customer during an enrolment procedure and storing the biometric elements in a database, which is accessible by the service provider's terminal;
  executing synchronised challenge procedures for each transaction (or session, i.e. one transaction with any number of sub-transactions) in order to produce identical challenges based on current transaction data and identical processing instructions;
  with the customer's terminal, capturing biometric data from the customer's response provided for said challenge;
  delivering transaction data together with the biometric data of the customer's response to the service provider's terminal;
  retrieving and assembling biometric elements according to the challenge in order to assemble a separate response in the service provider's terminal; and
  comparing the biometric data of the customer's response with the data of the assembled response and performing the transaction requested by the customer in the event that the data of the responses match.

Biometric elements are captured during an enrolment procedure and used as a reference for authentication and verification procedures. For the present invention biometric elements preferably relate to movements of the customer's mouth region, particularly movements of the lips and tongue as well as to simultaneously captured audio information. Preferably movements of the lips and tongue as well as corresponding vowels and consonants, or speech segments, comprising for example the numbers of 0, . . . , 9, are recorded. During authentication procedures biometric data of this kind can easily be captured by a camera and a microphone, which are typically available in modern computer systems.

Hence, with the inventive method authentication and verification processes can be simplified while maintaining or even increasing security. Particularly the number of transmission sequences can be reduced, since challenges are not transferred over the network but generated in parallel on the side of the customer and on the side of the service provider. As a consequence transaction sessions require less telecommunication resources and will be less time consuming.

The customer and the request (transaction data) forwarded by the customer are authenticated in a manner that is not vulnerable to MITM-attacks. The "man in the middle" will not be able to produce the response required for authentication. Transaction data provided by the customer can not successfully be modified by means of a MITM-attack, since the inventive challenge/response procedure uses transaction data and biometric responses in reply to challenges. For this purpose at least part of the address of the beneficiary of the transaction and/or at least part of the transaction value, definitions of the goods or numbers, are extracted out of the transaction data and used for performing the challenge procedures.

In the event that a transaction involves numerous sub-transactions, e.g. numerous payment orders, then transaction data is extracted preferably from all sub-transactions. E.g., checksums of the payment amounts may be summed up and then treated according to a current challenge instruction. Hence, numerous sub-transactions can be authenticated in one step.

With the inventive method practically no relevant risks remain. In order to break the security chain an implanted MITM-process would need to have all processing instructions at its disposal as well as the number of the currently applied set of processing instructions. Further the MITM-process would be required to establish the biometric response which would not be possible without having and correctly and seamlessly assembling biometric elements.

Hence, In order to further reduce the remaining risks the sequence of biometric data captured from the customer's response is examined in the service provider's terminal in order to determine, whether an uninterrupted, seamless data stream has been provided by the customer's terminal. In the event that it is detected that the response consists of assembled biometric elements the requested transaction is rejected. Alternatively or in addition, voice recognition and/or face recognition could performed, which would be difficult, if the response would consist of a sequence of assembled biometric elements.

Further, in order to facilitate the detection of such manipulations a data sequence could easily be included in the biometric data, e.g. embedded in a video recording, such as the time information or a sequence of numbers, which is examined in the service provider's terminal.

Hence, even if the challenge information would be accessible by the "man in the middle", it would be practically impossible to establish the response data.

However the challenge information can easily be protected by several measures. The processing instructions that are used for performing the challenge procedures will preferably be altered from transaction to transaction. Further, sets of processing instructions are forwarded in a machine readable or in a non-machine readable format to the customer's terminal. Hence, the sets of processing instructions are applied manually, automatically in a sequence or according to a specific rule or reference. This rule or reference may also be provided in a machine readable or in a non-machine readable format. As an example, a sequence of ten images could be provided on-line to the customer, each comprising a non-machine readable number that shall be used as processing instruction for the challenge procedure. Further an additional image could be provided on-line to the customer with a non-machine readable number between 1 and 10. Hence the customer would read the number on the additional image and select the correct image with the actual processing instruction for the challenge procedure. While this appears to be complex it can easily be accomplished with simple control procedures.

Consequently the "man in the middle" does not know which set of processing instructions is applied.

The sets of processing instructions can be delivered on-line or over separate channels. Further, the customer may use a memory stick, which can be loaded with sets of processing instructions whenever the customer visits the service provider, e.g. the bank, a shopping center, etc. During the challenge procedure the extracted transaction data is combined with the current set of processing instructions, which preferably contains or indirectly points to specific fixed or variable data, such as a constant number or the current date or time.

The inventive network-based system comprises for each service provider at least one authentication server, which is accessible over at least one network, such as the Internet, from the customer's terminal. As a customer terminal a personal computer, a notebook or a mobile phone can be used, which is equipped with audio- and video-recording devices and designed for simultaneously capturing biometric audio and video samples from the related customer.

For the enrolment of a customer into the inventive system the service provider uses an internal or external registration authority. For the enrolment the customer initially provides credentials, such a as a passport, an official certificate, that allow correct authentication of the customer. Based on these credentials a non-biometric customer profile is established.

Then, for dictated speech elements or speech segments or related information that is provided by the registration authority, biometric elements, i.e. audio and video samples, are simultaneously captured from speech elements or speech segments expressed by the customer by means of a registration server that is equipped with audio- and video-recording devices.

Then, the non-biometric customer profile is stored in a database together with the dictated information and the accordingly captured biometric elements, which represent the biometric profile of the customer. The number of biometric elements captured is sufficient to cover responses for all challenges that could possibly be presented to the customer during authentication procedures. Hence, not a predetermined static image of the biometric profile, e.g. represented by static sequences of movements or acoustical expressions is taken and applied, which would be vulnerable to a spoof attack. Instead biometric elements are captured that allow handling of challenges that are not-predetermined or even randomly established. A challenge which is built based on transaction data is not randomly established but has the same quality seen from an attacker.

For a given challenge the biometric response is recorded and sent over the network to the authentication server, which compares the biometric response with a response that is assembled from biometric elements that were retrieved from a local database or the database of the registration authority.

If the rightful customer has provided the biometric response, then the sequence of the customer's biometric response and the accordingly assembled biometric response will closely match. Preferably based on a threshold, it is evaluated, how well the data match and indicated whether or not an authentication of the customer and consequently the customer's request that is presented in a transaction summary has been achieved.

BRIEF DESCRIPTION OF THE DRAWINGS

Some of the objects and advantages of the present invention have been stated, others will appear when the following description is considered together with the accompanying drawings, in which.

DETAILED DESCRIPTION OF THE PREFERRED EMBODIMENTS

Figure 1:
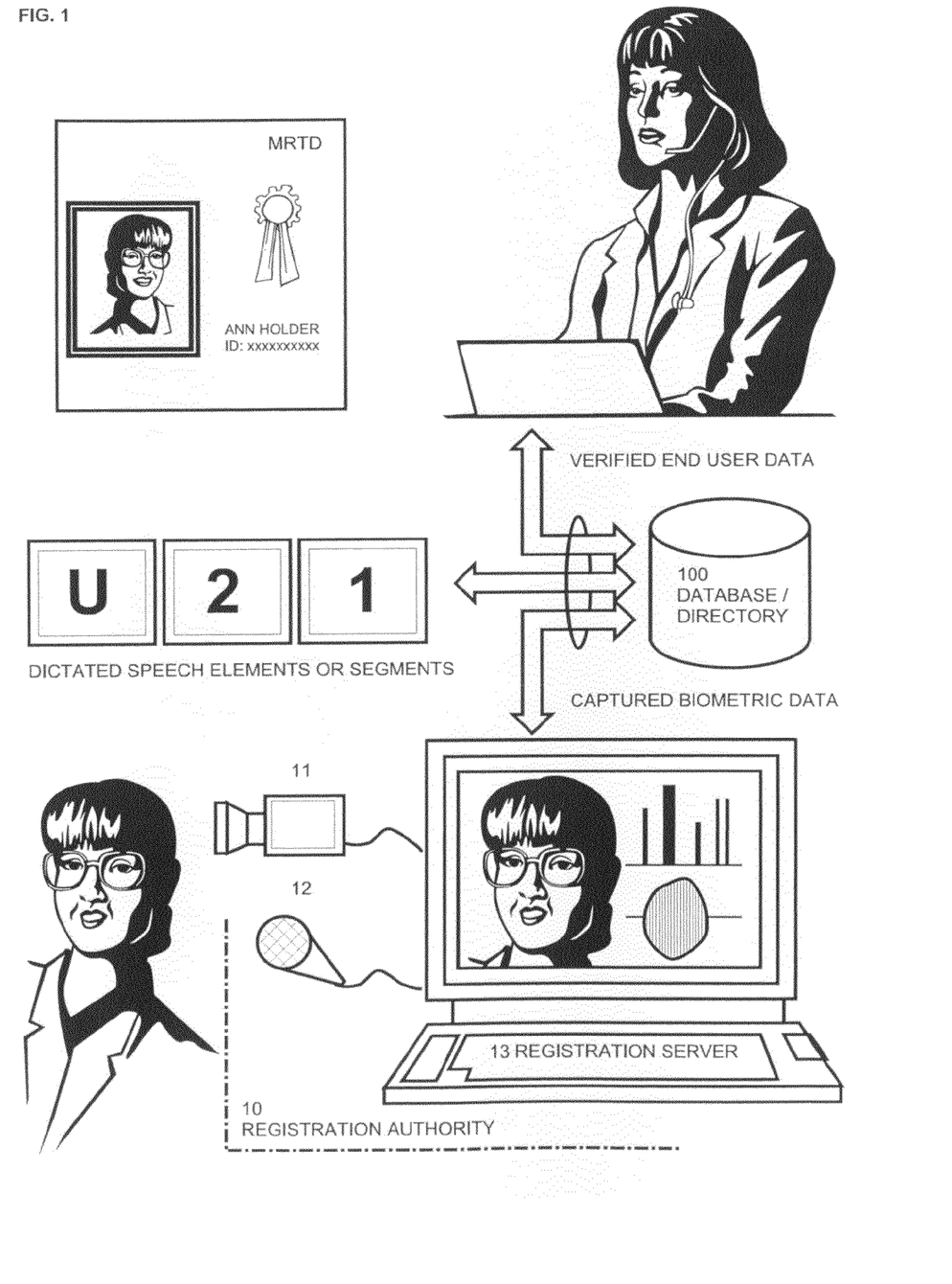
FIG. 1 shows, the enrolment of a customer at a registration authority 10.

FIG. 1 illustrates the registration authority 10 of an inventive system during enrolment of a customer. For this purpose the customer has provided credentials, i.e. the passport shown in FIG. 1, to the registration officer who verifies the customer's data and establishes a non-biometric customer profile.

Then, in order to establish a biometric customer profile the registration officer dictates speech elements or speech segments "U-2-1-, . . . " which are repeated by the customer. For the corresponding speech elements expressed by the customer, biometric audio and video samples are simultaneously captured by means of video-recording devices 11, 12 (e.g. a microphone and a digital camera) that are connected to a registration server 13. In order that all possible challenges can be executed with the inventive method preferably all speech elements, together with the related gestures of lips and tongue, are captured that are at least required to spell words and numbers. Typically the customer will be asked to repeat all letters of the alphabet as well as all relevant numbers, e.g., 1-100, and 1000. Recorded speech elements could even be assembled and concatenated, in order to generate new words. Hence, the captured biometric elements allow assembling any possible response, at least if the given challenge is spelled.

The captured biometric elements that represent the customer's biometric profile are then stored together with the non-biometric profile in the database 10 or directory of the registration authority.

Further stored is information, which identifies the captured biometric elements. This information may be stored in the form of dictated speech elements or speech segments or preferably as a code that points to the dictated speech elements or speech segments e.g. text-, audio- or graphics-files that stored in the database 100 or in a separate database. The information, which relates to the dictated speech elements or speech segments may be stored as text, which may be used as the file name for the captured audio and video sample files. E.g. the file "2.wav" would be a raw audio file that contains the waveform captured from the customer for the expressed word "two". The wav-file may however be designated with a code xyz.wav with xyz pointing to dictation "two" or "2" contained in another database; i.e. the identifier xyz would link the captured biometric data contained in one memory range to dictated data stored in another memory range.

On the screen of the registration server a waveform for the word "two" is illustrated as well as a spectrogram of the waveform that represents a typical pattern for this customer.

Figure 2:
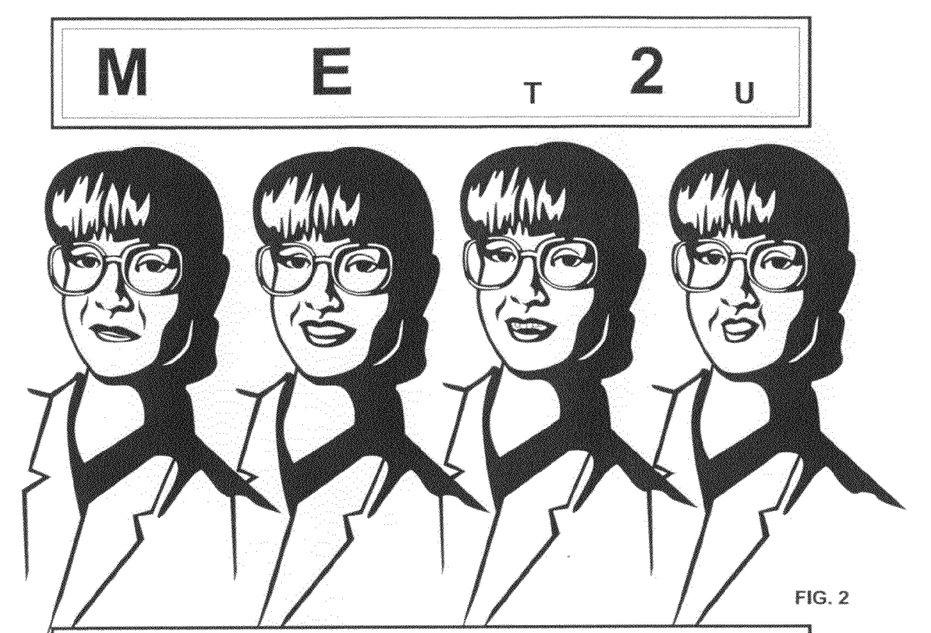
FIG. 2 shows a sequence of biometric elements, i.e. speech elements and face movements expressed by the customer in reply to dictated speech elements provided by the registration authority 10 during enrolment.

FIG. 2 shows a sequence of speech elements and segments that were expressed by the customer based on dictated speech elements, which were issued in text-form, in graphical form or as an audio file. FIG. 2 shows that the speech elements "T" and "U" could be replaced by the speech segment "2".

Figure 3:
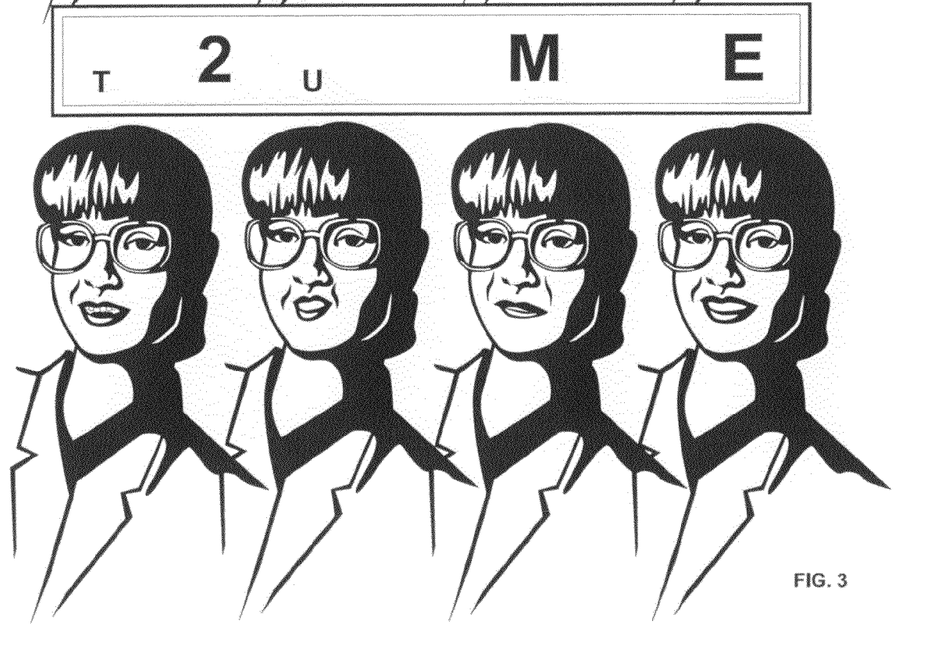
FIG. 3 shows the biometric elements of FIG. 2 that were captured in reply to a challenge dictated by an authentication server 15 in a different sequence.

FIG. 3 shows the biometric elements of FIG. 2 in a different sequence captured in reply to a random challenge issued by an authentication server 15 (see FIG. 6) for on-line authentication purposes. Hence, the inventive system can also operate in a fully random challenge mode, in which challenges are generated independently from transaction data in the authentication server 15 and forwarded over the network 5 to the customer, who establishes and returns a response.

Further, the inventive system can also operate in a challenge mode, in which challenges are generated based on transaction data in the authentication server 15 and forwarded over the network 5.

Since the speech elements captured from the customer can be assembled according to a response to a any challenge, the authentication server 15 can compare the on-line response of the customer with the pre-stored and correctly assembled biometric data and decide whether the data match closely enough for the authentication of the customer, who establishes and returns a response.

However, most advantageously, synchronised challenge procedures are performed in parallel in the customer's terminal 23 and in the authentication server 15 as will be explained below.

The risk that an impostor is able to simultaneously provide identical biometric response for a unique challenge is extremely small. However the security level provided with these measures can further be increased with additional authentication processes such as voice recognition and/or face recognition methods, which are described in [3]. For this purpose the characteristics of the voice and face of the customer are registered during enrolment and stored in the database as well. Voice recognition and face recognition provide a higher trust and can be performed with the information already captured.

Figure 4:
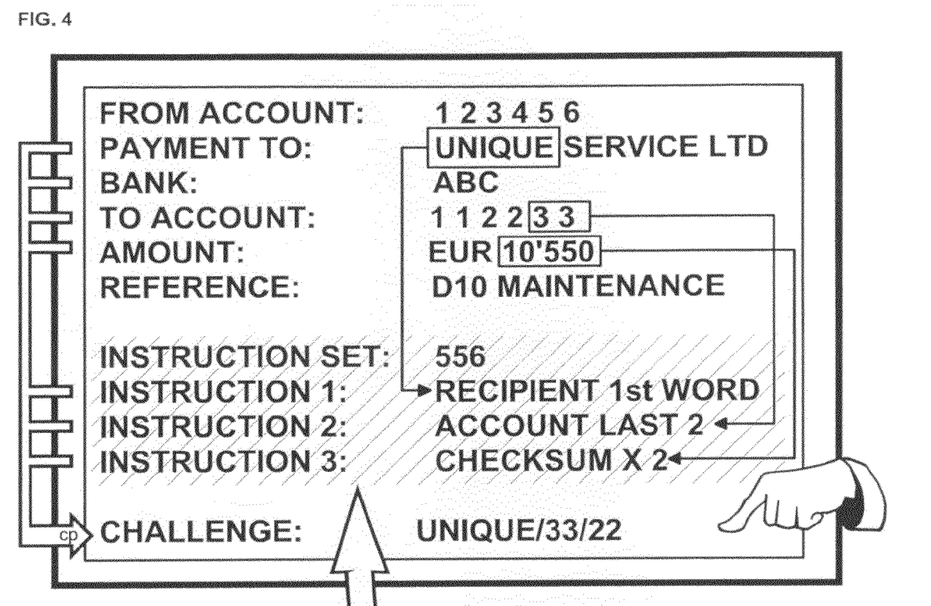
FIG. 4 shows an example of transaction summary and challenge information generated according to instructions contained in an instruction set (566)

FIG. 4 shows an example of a transaction summary as well as corresponding challenge information generated according to challenge instructions contained in an instruction set. The transaction summary contains the request to transfer the amount of EUR 10,550 from the customer's account 123456 to the account 112233 of the recipient UNIQUE SERVICE LTD at the bank ABC under reference D10 MAINTENANCE.

In order to generate the challenge information, an instruction set is used which comprises 3 different instructions defining that the first word of the recipient's name "UNIQUE", the last two numbers of the recipient's account "33" and the checksum of the amount $(1+0+5+5+0=11)$ multiplied by 2 $(11 \times 2=22)$ will be included in the challenge information, which reads UNIQUE/33/22.

Hence, upon receipt of the transaction summary the challenge information could be established in the authentication server 15 and sent to the customer's terminal 23. However, in order to avoid this transmission and corresponding efforts, the challenge information is already established in the customer's terminal 23 based on the instruction set that has been delivered earlier by the service provider.

Due to the applied biometric procedures the security provided with the described method is already extremely high. With simple additional measures the security level can further be raised.

Instead of a single instruction set the service provider can deliver a high number of instruction sets to the customer, which are then stored and used in parallel in the customer's terminal 23 and in the authentication server 15. The instruction sets change, e.g. rotate or randomly alter, synchronously in the customer's terminal 23 and in the authentication server 15 preferably controlled by a synchronisation process. For example, a random generator may be applied in the authentication server 15 that sends a reference number to the customer during or after the login procedure.

Figure 5:
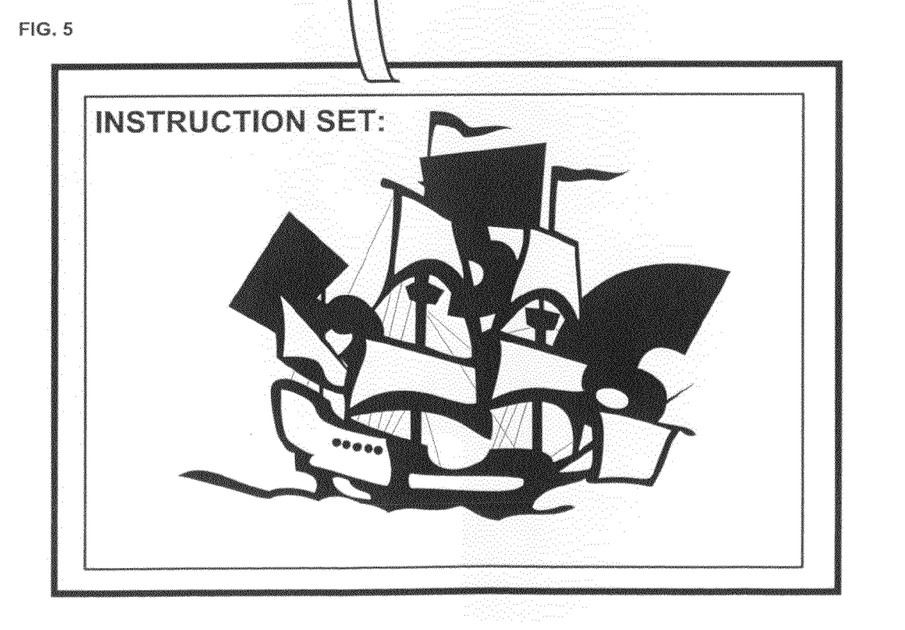
FIG. 5 shows an image provided by the authentication server 15 containing a non-machine readable reference number (566) pointing to the instruction set applied in the example of FIG. 4.

As shown in FIG. 5 the reference number, which points to an instruction set, can advantageously be enclosed non-machine readable in an image. The customer will easily recognise that number "556" is embedded in the picture, which however is not accessible by the "man in the middle".

The image shown in FIG. 5 is in fact a simple challenge to the customer that will be answered with an extremely complex response that on the one hand can not be established by the "man in the middle" but on the other hand can easily, practically hands-free, be provided by the customer, who is guided by the inventive system. Hence, the complexity lies in the software procedures and not in the steps that are to be taken by the customer or the service provider. Delivering a hidden reference number, as shown in FIG. 5, is only one, but an important option for synchronising the challenge procedures in the terminals 23, 15 of the customer and the service provider. Hence, the image shown in FIG. 5 is an initial challenge, which is optionally provided and which contains data that are required to generate the main challenge, as exemplarily illustrated in FIG. 4, locally.

Hence, with entering reference number "556" over the keyboard or preferably the microphone the customer can initiate the challenge procedure described above, which is based on instruction set no. 556. As soon as the transaction summary is established, the customer initiates the challenge process that is based on instruction set no. 556.

When the (locally generated) challenge information "UNIQUE/33/22" is presented on the screen, the customer preferably spells the letters U-N-I-Q-U-E and the numbers 3-3-2-2. The recorded sound and video data, i.e. the uninterrupted biometric response is then enclosed in a data file and sent to the authentication server 15, which creates an identical challenge based on the transaction summary and instruction set 556. Then, for the resulting challenge information, a response is assembled based on biometric elements that are downloaded from the database 100. Finally the customer's response, that preferably has been examined, will be compared to the assembled response. In the event that the responses match, the transaction summary will be forwarded to the transaction server 3 for execution. Hence, a simultaneous authentication of the customer and the customer's request has been achieved.

Figure 6:
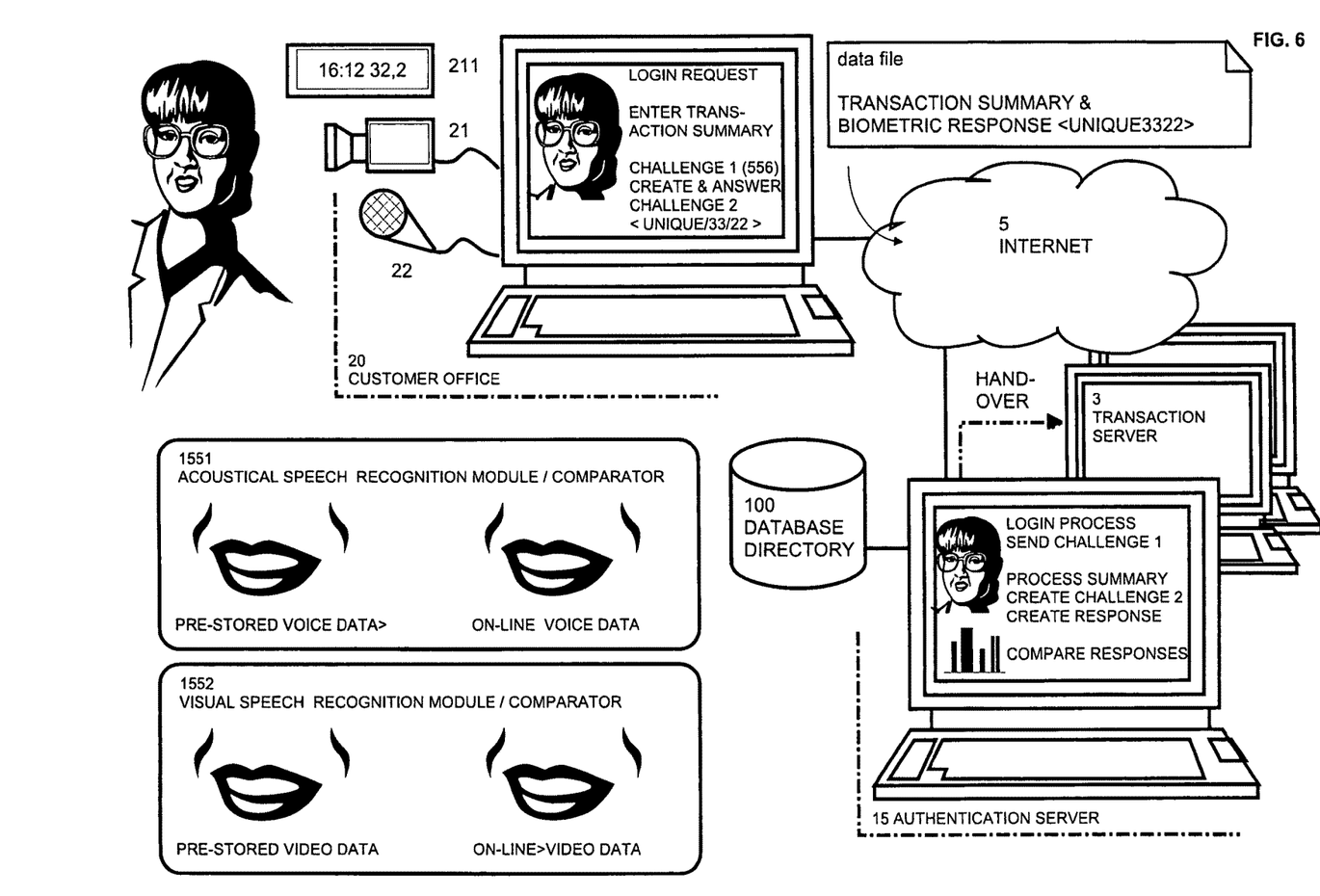
FIG. 6 shows the authentication procedure performed with an inventive system.
Figure 7:
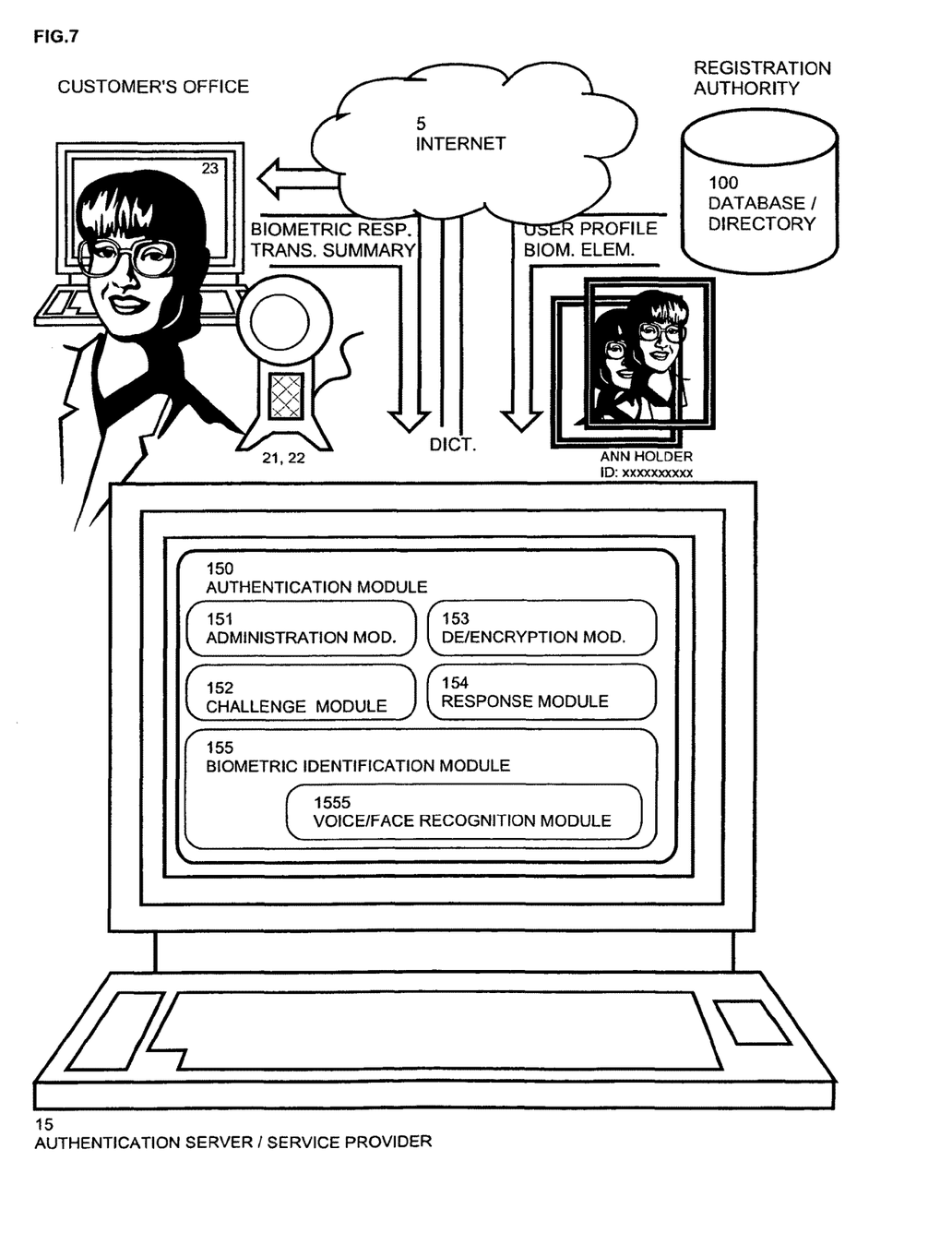
FIG. 7 shows further details of the authentication procedure of FIG. 6 and modules implemented in the transaction server 15.
Figure 10:
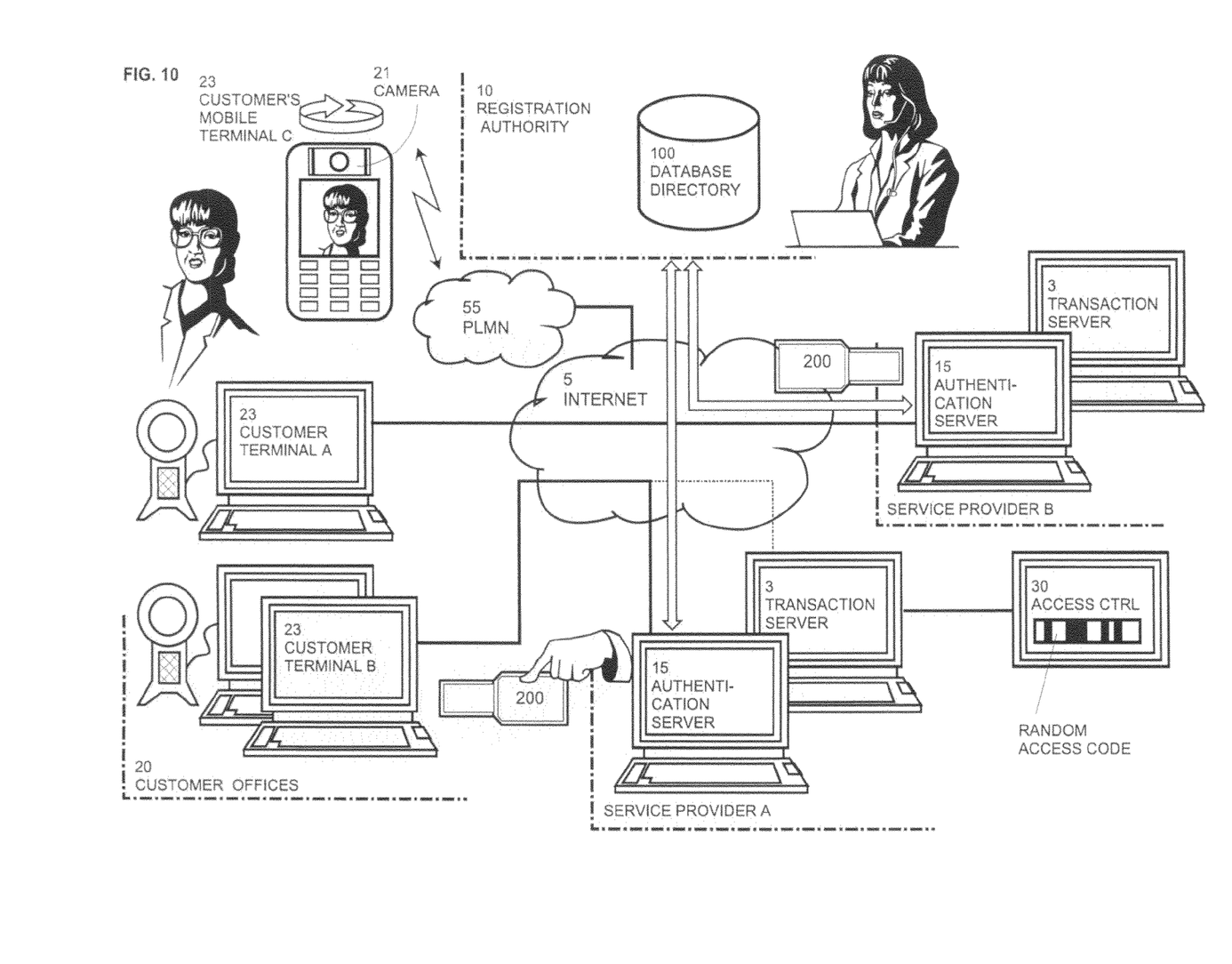
FIG. 10 shows a distributed network-based system, which operates according to the inventive method, with an independent registration authority 10 that provides services for various customers and service providers.

FIG. 6, FIG. 7 and FIG. 10 illustrate the inventive network-based systems that allow authentication of customers and customer requests.

A network-based system, as shown in FIG. 6 and FIG. 10, typically comprises numerous customer terminals 23, which are installed in customer offices 20, and at least one authentication server 15, which is installed at a service provider's premises, such as a commercial, financial or official institution, that offers services or goods for the customer. The customer terminals 23 and the authentication server 15 are connected to a common network 5, such as the Internet, over which data is exchange preferably in compressed and encoded form.

In the embodiment shown in FIG. 6 the authentication server 15 has direct access to the database 100 of the registration authority indicating that enrolment and authentication are performed within the premises of the service provider. In this event, the service provider independently operates the network-based system in order to authenticate customers and their requests before commercial transactions are executed by the transaction server 3 which receives the transaction summary from the authentication server 15. Although the authentication server 15, the transaction server 3 and the registration server 10 are shown as separate entities, it is understood that this entities can be integrated as modules in a single terminal of the service provider. Hence the term "terminal of the service provider" covers also distributed system, e.g. a local network with several servers attached or a unified system with numerous software modules represented as one entity.

In the embodiment shown in FIG. 10 the registration server 10 is connected to the common network 5 and may independently provide registration services for different service providers which are not in mutual contact. Hence, the registration authority 10 provides services for smaller or larger service providers by centrally performing enrolment procedures. A service provider however may access the database 100 or a corresponding server, e.g. the registration server 13 of the registration authority 10, through the authentication server 15 in order to download the registered non-biometric and biometric profiles of a customer for authentication purposes. The cost for maintaining the registration authority 10 can therefore be shared by numerous service providers.

The authentication procedure illustrated in FIG. 6 and FIG. 7 is initiated with a login request by the customer, which may be performed with a random challenge/response procedure. For that purpose the authentication server 15 sends a random challenge, e.g. a randomly selected sequence of numbers and letters, to the customer's terminal 23, who will provide a biometric response that is returned to the authentication server 15. The authentication server 15 will compare the biometric response with a response established by assembling biometric elements and verify whether the responses match. However, since the authentication of the customer and the authentication of the customer's request can be performed in one step with the procedure described above, it is possible to run the login procedure at a low security level without biometric verification. For example the customer can simply enter a password.

When the login procedure has been completed the customer may enter the transaction data. If not already done so, the challenge procedures are then synchronised, e.g. by entering the number of the instruction set "556", which has been received from the service provider. Then the challenge information, e.g. "UNIQUE/33/22", is generated as described above with reference to FIG. 4. The response provided by the customer is recorded with a camera 21 and a microphone 22 and sent together with the transaction summary enclosed in data file to the authentication server 15, where the comparison with the response is made. In this process the customer can be authenticated as well as the request provided by the customer. The authenticated request is then transferred to the transaction server 3.

In order to provide evidence that the response has not been assembled by malware that has been implanted in the customer's terminal, sequence information such as a digital timing signal taken from the timer 211 of the camera 21 may be included in the video recording.

A "man in the middle" will therefore fail to deliver the response. Fraudulent actions can be detected and rejected.

FIG. 7 shows the basic data exchange between the customer's terminal 23, the authentication 15 and the registration authority, particularly the database 100, from which the biometric elements are downloaded.

For the execution of the authentication processes the authentication server 15 is provided with an authentication module 150 that comprises a) an administration module 151, that allows processing a login or authentication request by the customer, particularly the verification of non-biometric data and that allows transferring biometric and non-biometric data to and from customer terminals 23 and the database 100 of the registration authority;

b) a challenge module 152 that allows generating challenges based on transaction data and challenge instructions and that can be synchronised with a challenge module 232 that is provided in the customer's terminal;

c) an encryption and decryption module 153 that allows encrypting and decrypting and/or compressing of the transferred data;

d) a response module 154 that allows assembling biometric elements downloaded from the database 100 according to the present challenge in order to provide an assembled response and e) a biometric authentication module 155 that allows comparing the biometric response received from the customer with the assembled response in order to determine whether they match.

For the comparison of the biometric data, the authentication module 155 comprises a voice recognition module 1551 and visual speech recognition module 1552, more precisely comparators that evaluate the differences between the pre-stored and the on-line recorded biometric data. Both modules are schematically shown in FIG. 6 with the relevant mouth region that significantly moves during the expression of the dictated speech elements. Preferably further regions of the face are excluded. Hence, the kind of glasses the customer is wearing or her hair style do not influence the captured biometric data. This gives the customer the required freedom to select a desired appearance without causing a false rejection.

In a preferred embodiment the authentication module 155 further comprises a module 1555 that allows face recognition and/or non-text dependent voice recognition.

Figure 8:
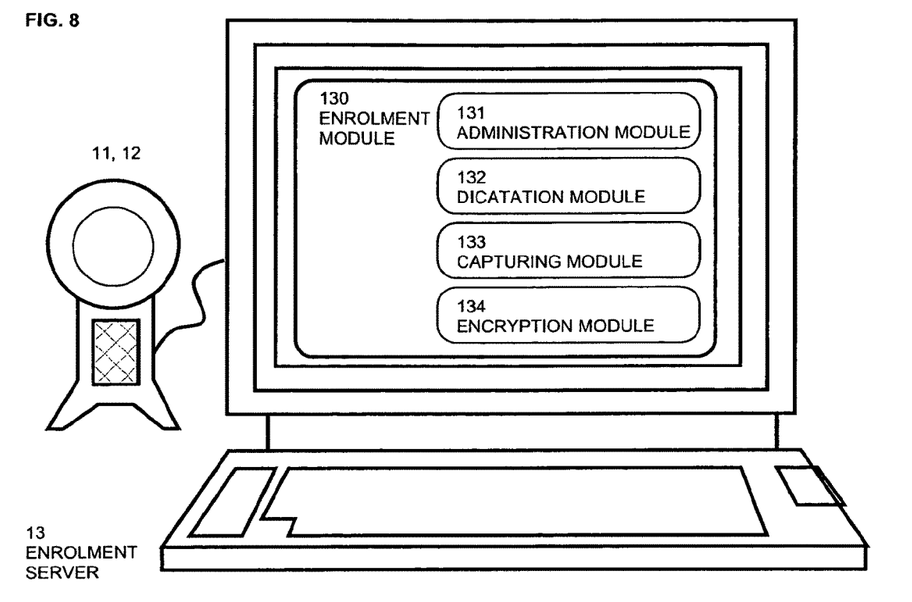
FIG. 8 shows the registration server 13 with the implemented enrolment module 139, which comprises sub-modules 131, . . . , 134.

FIG. 8 shows the registration server 13 of FIG. 1, which comprises an enrolment module 130 with a) an administration module 131, that allows processing an enrolment request presented by the customer, particularly the registration of non-biometric data;

b) a dictation module 132 that allows individually creating and dictating or displaying sequences of speech elements or speech segments;
c) a capturing module 133 that allows capturing of biometric audio and video samples and preferably extracting corresponding biometric data; and
d) an encryption module 134 that allows encrypting and/or compressing the captured biometric audio and video samples or the related biometric data for the storage in the database 100.

Figure 9:
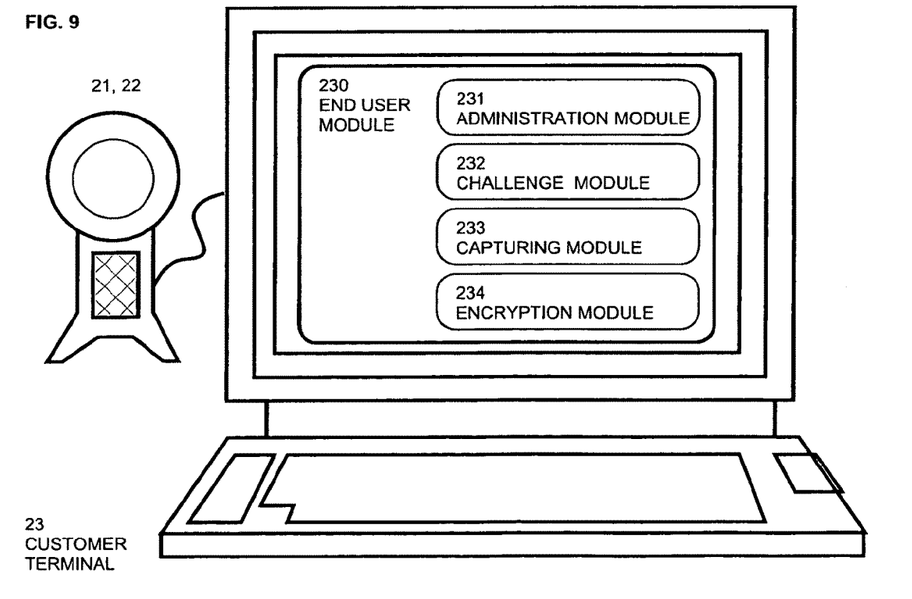
FIG. 9 shows the customer's terminal 23 with the implemented customer module 230, which comprises sub-modules 231, 234.

FIG. 9 shows the customer's terminal 23 of FIG. 6, which comprises a customer module 230 comprising
a) an administration module 231, that allows processing a login or authentication request by the customer, particularly forwarding of non-biometric data to the authentication server 15 and forwarding captured biometric data and transaction data to the authentication server 15;
b) a challenge module 232 that allows generating challenges based on transaction data and selected instructions and can be synchronised with the challenge module 152 provided in the authentication server 15;
c) a capturing module 233 that allows capturing of biometric elements, i.e. biometric audio and video samples and preferably extracting corresponding biometric data; and
d) an encryption module 234 that allows encrypting and/or compressing the captured biometric audio and video samples or the related biometric data for the transfer to the authentication server 15.

The embodiment of the network-based system shown in FIG. 10 has basically been described above. In FIG. 10 it is further shown that customer terminals 23 may get connected over various networks, e.g. a PLMN 55 (a public land mobile network such as a GSM- or UMTS-network), a PSTN (public switched telephone network) such as the ISDN and the Internet including the required gateways with the authentication server 15. Technology required for establishing connections between terminals over various networks is described in [5], US 2004/0095945 A1. Hence, a mobile phone 23 that is equipped with a camera 21 may advantageously be used for performing authentication processes according to the inventive method. As shown in FIG. 10, the camera 21 of the customer terminal 21 is pivotally mounted and can be turned towards the customer for authentication purposes or in the opposite direction for taking images or videos.

Further shown in FIG. 10 is a customers memory stick 200 that can be used for transferring data, particularly instruction sets for the challenge procedures, from the authentication server 15 to the customer's terminal 23. However due to the high level of security provided by the inventive method, this data can be transferred on-line as well.

References
[1] A. Menezes, P. van Oorschot, S. Vanstone, HANDBOOK OF APPLIED CRYPTOGRAPHY, CRC-Press, Boca Raton 1997
[2] US 2007/0043681 A1
[3] Anil K. Jain, Arun Ross and Salil Prabhakar, An Introduction to Biometric Recognition, IEEE Transactions on Circuits and Systems for Video Technology, Special Issue on Image- and Video-Based Biometrics, Vol. 14, No. 1, January 2004
[4] U.S. Pat. No. 6,101,264
[5] US 2004/0095945 A1

The invention claimed is:

1. A method for performing a requested secure online transaction based on challenge/response procedures executed by a terminal of a customer and by a terminal of a service provider, the terminal of the customer and the terminal of the service provider being connected to a network, the method comprising:
a) using the terminal of the service provider for capturing biometric elements from the customer during an enrolment procedure;
b) storing the biometric elements in a database that is accessible by the terminal of the service provider;
c) forwarding a set of processing instructions in a machine readable or in a non-machine readable format to the terminal of the customer for every transaction or for a number of transactions, the processing instructions defining operations to be performed on transaction data contained within a transaction summary that contains the customer's requested transaction;
d) based on the processing instructions executing synchronized challenge procedures for each transaction in a first challenge module provided in the terminal of the service provider and in a second challenge module provided in the terminal of the customer, thus producing identical random challenges based on current transaction data and identical processing instructions;
e) capturing, with a capturing module provided in the terminal of the customer, biometric data from a customer's response provided for the challenge established by the second challenge module;
f) delivering the transaction data and the biometric data of the customer's response to the terminal of the service provider;
g) retrieving from the database and assembling, in a response module provided in the terminal of the service provider, biometric elements according to the challenge established by the first challenge module in order to create a separate response; and
h) comparing, with a biometric authentication module provided in the terminal of the service provider, the biometric data of the customer's response with the data of the assembled separate response and performing the requested transaction in the event that the responses match.

2. The method according to claim 1 further comprising: performing an enrolment procedure for the customer including capturing and storing biometric elements that relate to movements of the customer's mouth region, as well as simultaneously capturing corresponding audio information comprising vowels and consonants, or speech segments.

3. The method according to claim 2, wherein the movements of the customer's mouth region are movements of the lips and tongue.

4. The method according to claim 1 further comprising: examining a sequence of the biometric data captured from the customer's response in the terminal of the service provider in order to determine whether an uninterrupted, seamless data stream has been provided from the terminal of the customer and rejecting the requested transaction in the event that it is found that the data stream received from the terminal of the customer has been assembled.

5. The method according to claim 4 further comprising: enclosing a data sequence in the biometric data, in the terminal of the customer and extracting and examining the enclosed data sequence in the terminal of the service provider.

6. The method according to claim 1 wherein the processing instructions are given so as to extract at least part of an address of a beneficiary of the transaction and/or at least part of a transaction value, goods or numbers, out of the transaction data and perform the challenge procedures based on the extracted data.

7. The method according to claim 1 further comprising: applying the set of processing instructions manually, automatically in a sequence or according to a specific rule or reference, which is provided in a machine readable or in a non-machine readable format.

8. The method according to claim 7 further comprising: combining extracted transaction data with a current set of processing instructions that directly contains, or indirectly points to, specific fixed or variable data.

9. The method according to claim 1 further comprising: performing voice recognition and/or face recognition based on patterns captured and stored during enrolment.

10. The method according to claim 1, wherein the biometric elements comprise at least one of audio and video samples or related biometric data from the customer.

11. The method according to claim 1 further comprising:
as a separate challenge, displaying to the customer in a non-machine readable format a reference symbol that corresponds to the set of processing instructions;
wherein the synchronized challenge procedures are executed only after receiving from the customer a correct input that corresponds to the reference symbol.

12. A network-based system designed for performing a secure online transaction based on challenge/response procedures executed with a terminal of a customer, which is equipped with audio- and video-recording devices, and with a terminal of a service provider, which is connected to a database that contains biometric elements, including audio and video samples captured from the customer during an enrollment procedure or biometric data related to the audio and video samples, the system comprising:
a) a first challenge module that is provided in the terminal of the service provider and a second challenge module that is provided in the terminal of the customer, wherein the first and second challenge modules allow randomly producing identical challenges for each transaction based on synchronized processing instructions, the processing instructions defining operations to be performed on transaction data contained within a transaction summary that contains the customer's requested transaction;
b) a response module provided in the terminal of the service provider that allows assembling biometric elements according to a challenge established by the first challenge module in order to assemble a response;
c) a capturing module provided in the terminal of the customer that allows capturing biometric data from a customer's response to a challenge established by the second challenge module; and
d) a biometric authentication module provided in the terminal of the service provider that allows comparing data of the assembled response with data of the customer's response that has been received from the terminal of the customer who provided the response to the challenge established by the second challenge module in order to determine whether the assembled response and the customer's response match.

13. The network-based system according to claim 12, further comprising:
a) a first administration module provided in the terminal of the service provider designed for entering a session with the terminal of the customer and to process a login request sent by the customer based on a stored customer profile retrieved from the database; and
b) a second administration module provided in the terminal of the customer designed for entering a session with the terminal of the service provider and to process and forward a login request.

14. The network-based system according to claim 12, wherein the terminal of the service provider comprises an authentication server and a transaction server.

15. The network-based system according to claim 12, further comprising a dedicated data channel for transferring encrypted or unencrypted sequence data that are used for synchronizing the first challenge module provided in the terminal of the service provider with the second challenge module provided in the terminal of the customer.

16. The network-based system according to claim 15, wherein the synchronization means is a dedicated data channel or a mobile memory unit.

17. The network-based system according to claim 12, wherein the terminal of the customer is a mobile phone that is equipped with a camera.

* * * * *